J. T. HUSTON.
PEANUT DIGGER.
APPLICATION FILED MAY 2, 1919.
1,412,614.  Patented Apr. 11, 1922.
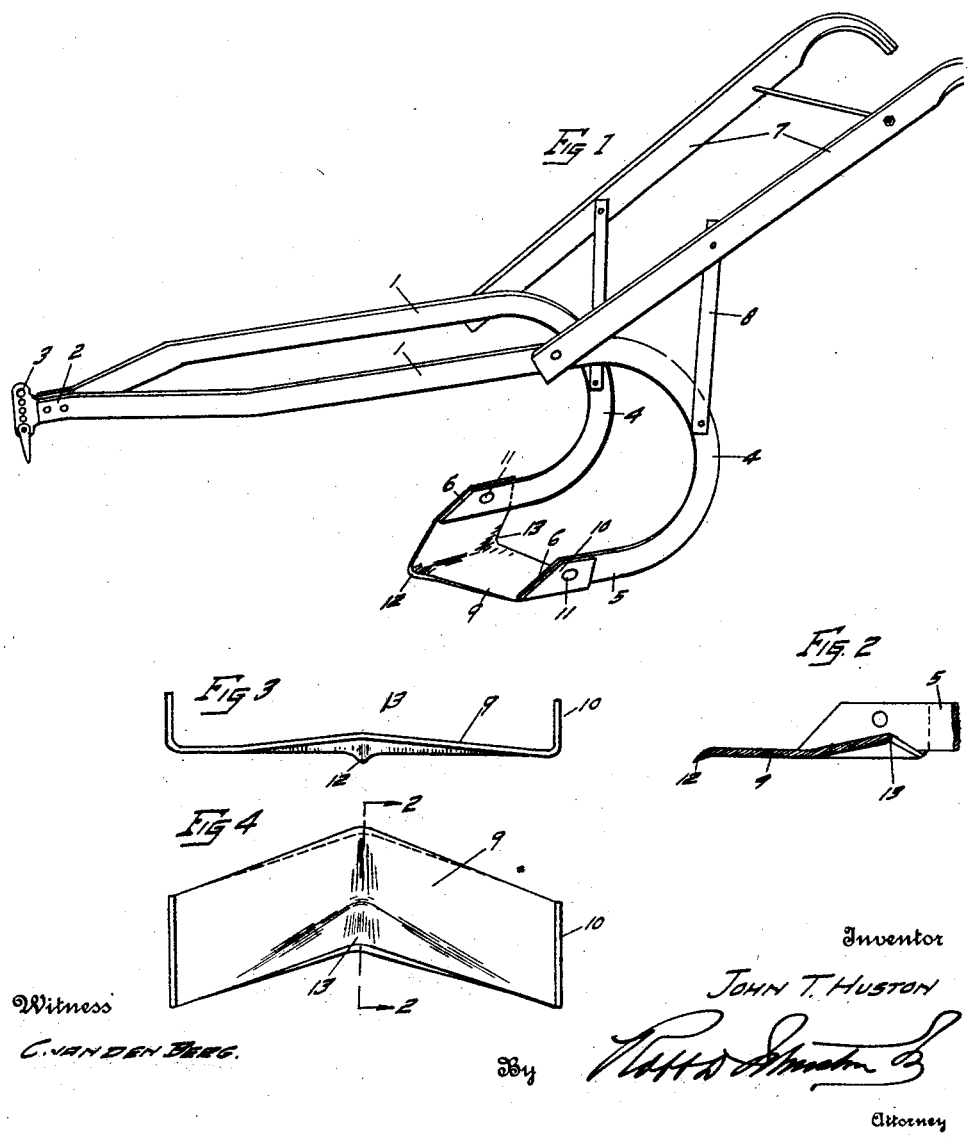

UNITED STATES PATENT OFFICE.

JOHN THOMAS HUSTON, OF COLUMBUS, GEORGIA.

PEANUT DIGGER.

1,412,614.     Specification of Letters Patent.     Patented Apr. 11, 1922.

Application filed May 2, 1919. Serial No. 294,258.

*To all whom it may concern:*

Be it known that I, John T. Huston, a citizen of the United States of America, residing at Columbus, in the county of Muscogee and State of Georgia, have invented certain new and useful Improvements in Peanut Diggers, of which the following is a specification.

This invention relates to an improvement in peanut diggers and my object is to devise an apparatus in which a peculiar type of blade is employed for most efficiently severing the vines from the tap root and loosening the top soil around the peanuts while at the same time avoiding any probability of the digger becoming choked or congested either from the roots below the surface or from the vines or foliage above.

My object is to design a blade which will be self sharpening and which can be drawn through the ground with small power and be easily handled. To adapt the blade to sharpen itself its body portion must travel through the ground on a horizontal plane and not be tilted, as a blade that works tilted will have friction on only one flat surface and will rapidly become dull, whereas when the friction is equal on the top and bottom over the entire cutting surface of the blade, the forward edges are kept sharp by friction and will shear the roots cleanly and easily. My improved type of blade is of the V-shaped type, that is to say, both its front and rear edges are V-shaped and substantially parallel with the main body portion of the blade lying in the same level which is departed from only at the rear edge of the center of the blade where an apex is formed to better loosen up and pulverize the layer of earth above the blade which contains the peanuts. This upturned rear edge of the blade, in addition to the function already described, has the advantage of very materially bracing and strengthening the V-shaped blade which would otherwise be weakened by the cutting away of its rear edge.

A further object of my invention is to perfect the frame construction to which the blade is attached so that I reduce to a minimum the probability of the standards becoming choked with the plants. To this end each standard is designed with a long horizontal forward extension to carry the blade with the object that the blade shall have passed under the vines and severed the roots and dropped the vines and top soil carrying the peanuts back in contact with the earth again before the foliage of the severed vines will contact with the upright portions of the standards. The vines, under these circumstances, will have a frictional grip of the ground to hold them and will not tend to drag along with the digger and choke it.

My invention also comprises the novel details of construction and arrangements of parts, which in their preferred embodiment only are illustrated in the accompanying drawings which form a part of this specification, and in which:—

Fig. 1 illustrates my improved peanut digger in perspective view.

Fig. 2 is a vertical sectional view through the blade on the line 2—2 of Fig. 4.

Fig. 3 is a rear view of the blade.

Fig. 4 is a plan view of the blade.

Similar reference numerals refer to similar parts throughout the drawings.

As illustrated in the drawings the peanut digger comprises a frame formed of bent metal standards 1 having their upper reaches inturned and bolted together at 2 with a clevis 3 interposed and secured in position by the same bolts. The rear ends of the standards are bent around downwardly on a symmetrical curve at 4 until they reach the ground level and then they have horizontal forward extensions 5 which are straight and have their front edges 6 cut at an angle. Handles 7 are attached to the upper reaches of the standard and are supported by braces 8 attached to the upper portions of the curved parts 4 of the standards. The blade 9 is substantially V-shaped in plan view having its ends 10 upturned and connected by bolts 11 to the front ends 5 of the standards. These front edges of the upturned flanges are sloped to conform with and lie flush with the sloping forward edges 6 of the ends 5 of the standards, which ends are disposed on the inside of the flanges 10 with their horizontal bottom edges engaging the top surface of the blade. This arrangement enables the blade to be attached with a single bolt 11 at each side. The straight flat bottom edges of the extensions 5 serve in the capacity of flat land sides which tend to keep the blade flat at its work. The side end portions of the blades are flat and the major part of the central body portion of the blade is also flat and lies in the same plane with the side portions except that its rear edge is sloped up to an apex 13 at its center from which point the blade slopes downwardly to the front and to each side and merges into the flat top level of the blade at a point spaced several inches from each side and at a point several inches forward of the rear center of the blade. The particular construction of the blade is important as upon its construction depends the effective operation of the digger. My object in utilizing the V-shaped blade is to give the blade a considerable reach from its front tip 12 to the rear edges of its ends, thereby increasing its bearing on the ground to keep it running horizontally while reducing its draft by the metal cut away to form the V-shaped rear edge. A blade having the same reach from front to rear with a V-shaped front edge and a straight back edge would have greater draft, would not dig the nuts any better, and it would not drop the severed top soil containing the nuts and tap roots back into the earth as quickly as the V-shaped blade would. It is of great importance that the top soil containing the roots and peanuts be dropped back onto the ground before the foliage of the severed vines shall engage the upright curved portions 4 of the standards, as the frictional grip of the ground will hold the severed vines so that they will drag past the standards, thus reducing the tendency of the digger to choke, whereas should the foliage engage the standards while the surrounding top soil is riding on the blade the foliage would tend to catch on and move with the standards and would quickly choke the digger.

The function of the raised central apex 13 across the central portion of the rear edge is to loosen the top soil so as to leave the peanuts in proper condition for harvesting. The height of the apex 13 which travels under the center line of the row is just enough above the top level of the blade to loosen up the soil without tending to turn it in any way or to sufficiently loosen the top roots and surface soil so that the vines would be too easily dragged by the standards and choke the digger.

The main body of the blade lying in a flat level plane which is so attached to the standard as to work horizontally assisted by the functioning of the flat undersides of the blade extensions 5 as land sides is of greatest importance in a device of this character to enable the blade to cut at a proper constant horizontal level under the top soil and do it automatically without requiring the constant manual control through the handles. This horizontal working of the blade gives equal ground friction to its top and bottom surface, thus automatically and continually maintaining its cutting edge very sharp and thus reducing any tendency to pull or drag at the roots.

This invention is not intended to be restricted in scope to the specific embodiments shown, but contemplates such modifications as come within the spirit and scope of the claims.

Having thus described my invention, what I claim as new and desire to secure by Letters Patent, is:—

1. A peanut digger comprising standards having substantially flat elongated horizontal forward extensions at their base, and a V-shaped blade attached at its sides to the forward ends only of said extensions and disposed in a horizontal plane except in the central portion of its rear V-shaped edge which is raised and free of rearward extensions, as and for the purposes described.

2. A peanut digger comprising standards which extend downwardly and have elongated bottom horizontal extensions terminating a substantial distance forward from the vertical section of the standards, a substantially flat V-shaped blade attached at its sides to the forward ends only of said standard extensions and having the central portion of its rear edge gradually rising from near the sides and from a central point near the rear edge of the blade to a central apex at the center of the rear edge, substantially as described.

3. A peanut digger comprising standards which extend downwardly and have elongated horizontal flat bottom extensions terminating in downwardly inclined ends disposed a substantial distance from the vertical section of the standards, a substantially flat V-shaped blade free of all attachments except at its sides which are bent up and lapped on the outside of the forward ends of said standard extensions and sloped to conform to the inclination of said extension ends, there being a central portion of the rear edge of the blade which gradually rises from its sides and from a middle point near the rear edge to a central apex at the center of the V-shaped rear edge of the blade, as and for the purposes described.

4. A peanut digging blade comprising a V-shaped flat body portion having means at its ends for attachment to standards and having its rear V-shaped edge rising from the sides to an apex near its center and sloping downwardly and forwardly from said apex so as to merge into the top level of the plate near the rear edge so as to leave the main body portion of the plate lying in the same plane.

In testimony whereof I affix my signature.

JOHN THOMAS HUSTON.

Witness:
F. L. McEachern.